2 Sheets--Sheet 1.
A. JOHNSON.
Improvement in Fastening Sheet Metal to Roofs.
No. 4,870. Reissued April 16, 1872.
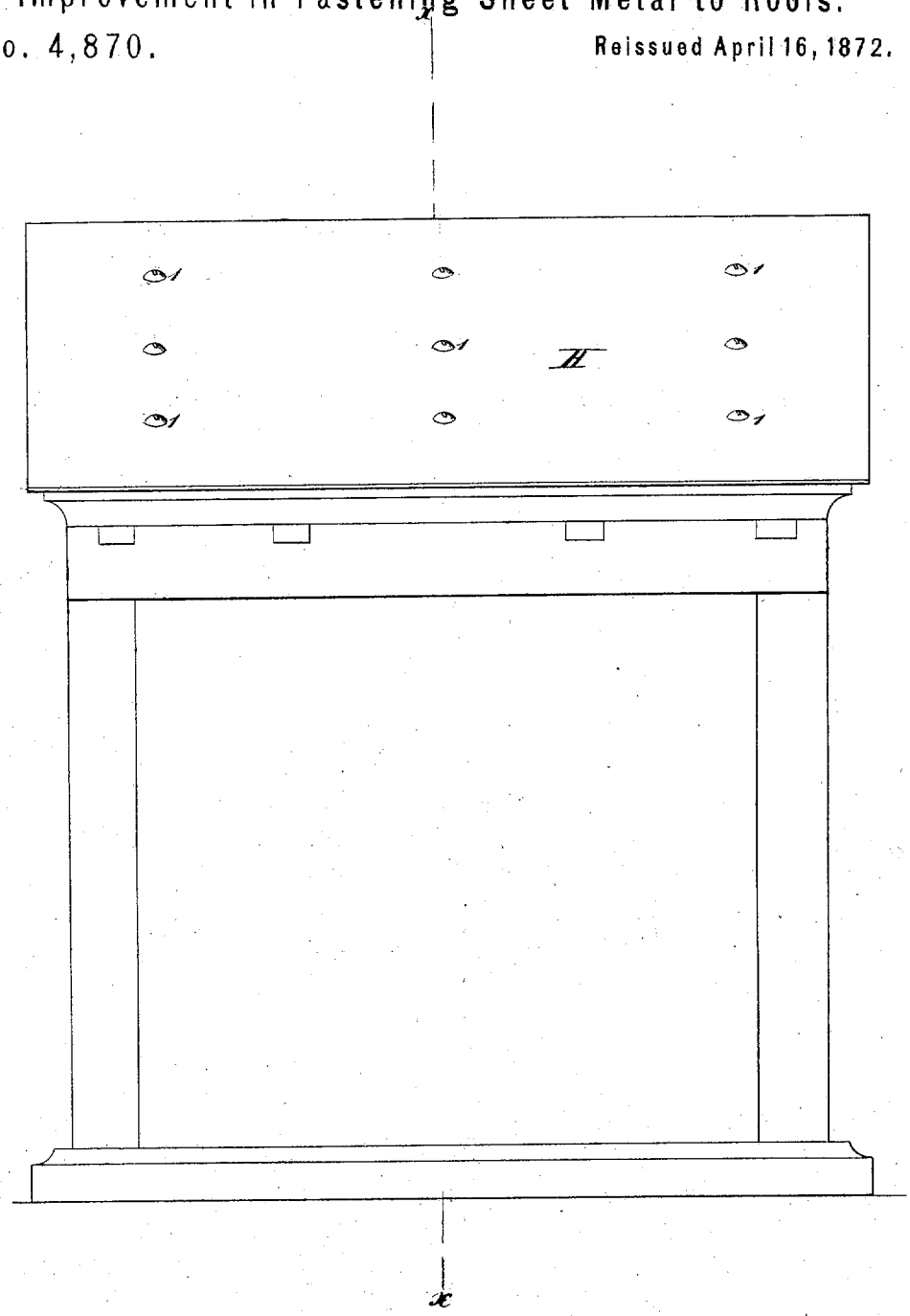
Witnesses:
Wm Sautins
E. F. Kastenhuber
Inventor:
Asa Johnson
AM. PHOTO-LITHOGRAPHIC CO. N.Y. (OSBORNE'S PROCESS.)

A. JOHNSON.
Improvement in Fastening Sheet Metal to Roofs.
No. 4,870. *Fig. 2.* Reissued April 16, 1872.
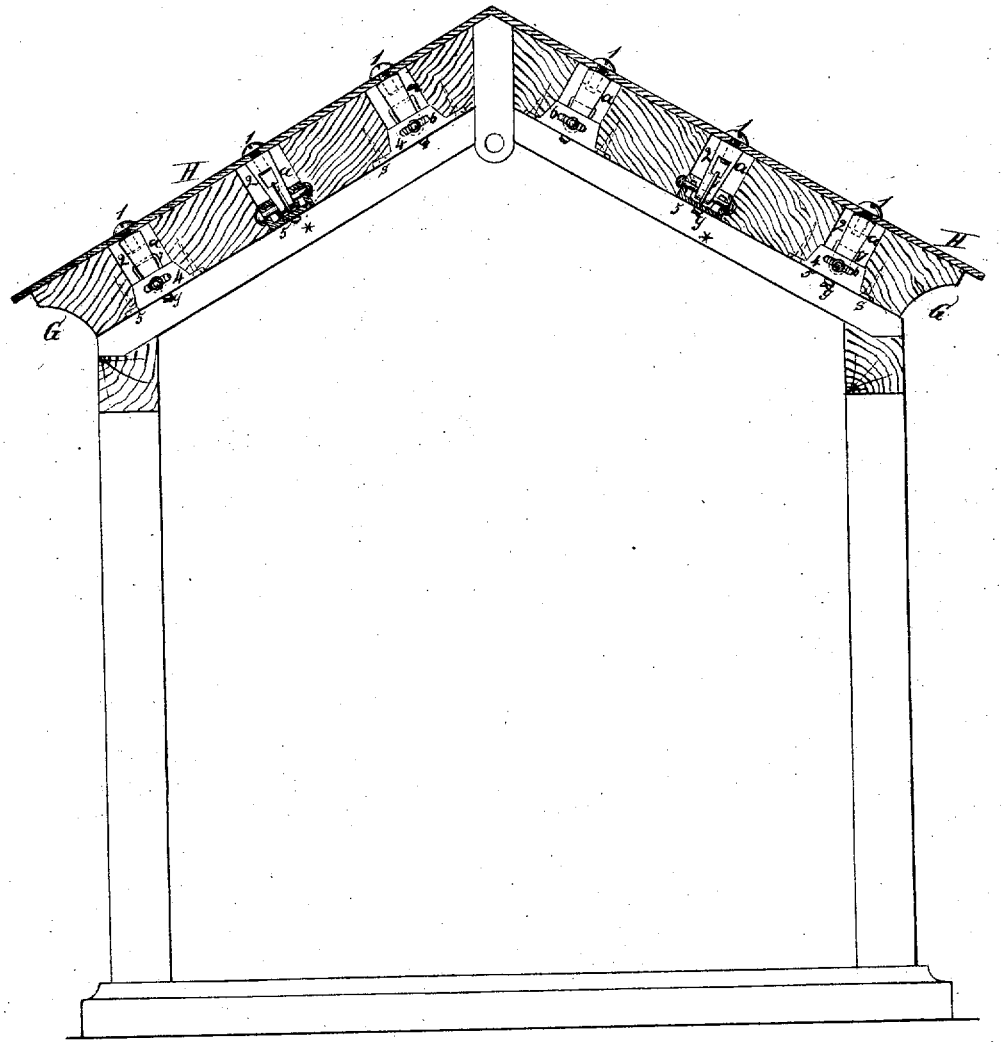
*Fig. 3.*
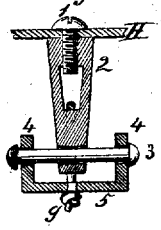
*Fig. 4.*
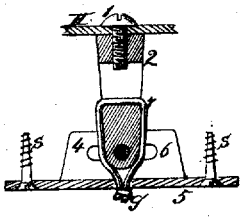
*Fig. 5.*
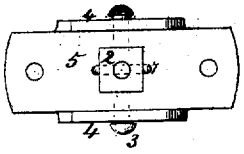
*Witnesses:*
W. Van Santvoord
E. F. Kastenhuber
*Inventor.*
Asa Johnson
AM. PHOTO-LITHOGRAPHIC CO. N.Y. (OSBORNE'S PROCESS.)

UNITED STATES PATENT OFFICE.

ASA JOHNSON, OF NEW YORK, N. Y., ASSIGNOR OF TWO-THIRDS INTEREST TO THOMAS S. SANDFORD.

IMPROVEMENT IN FASTENING SHEET METALS TO ROOFS.

Specification forming part of Letters Patent No. 17,331, dated May 19, 1857; extended 7 years; reissue No. 4,870, dated April 16, 1872.

*To all whom it may concern:*

Be it known that I, ASA JOHNSON, of the city of New York, formerly of the town of Cairo, New York, have invented a new and useful mode of self-adjusting fastenings for fastening metallic coverings to buildings, and for use in any and all other places where metals require fastening and their contraction and expansion require accommodation; and I do hereby declare the following to be a full, clear, and exact description thereof, which will enable those skilled in the art to make and use the same, reference being had to the accompanying drawing forming a part of this specification, in which drawing—

Figure 1 is a side elevation of a building. Fig. 2 is an end elevation of a section through the roof in the line *x x*, Fig. 1. Fig. 3 is an end elevation, in section, of my adjustable fastening and the device for connecting the same to the metal roof detached. Fig. 4 is a side elevation of the same in section. Fig. 5 is a plan view of the bottom plate, to which the bearings of the adjusting-bolt are attached in this instance.

The principle of my invention consists in connecting the metal to be fastened with a bolt or pin arranged to slide in slotted bearings in the direction of expansion or contraction, said adjustable bolt and its bearings being combined with the materials to be fastened.

I have found my adjustable fastener peculiarly useful in fastening metallic roofs to buildings, and I proceed to describe its construction and use in that connection, from which other uses will be obvious.

In using my self-adjusting fastener for fastening metallic roofs to buildings I connect the sliding bolt or pin with the roof by means of a stud fastened to the same, and I form the side plates, which contain the bearings for the sliding bolt, in connection with and as flanges of a bottom plate, which is secured fast to the under side of the wooden sheathing of the building.

In the drawing, 1 indicates the screws for attaching the metallic roof to the stud. 2 is the stud. 3 is the adjusting bolt or pin, to which the metallic roof is connected by the stud and screw, said bolt passing through the stud 2 and through the slots of the side plates or flanges. 4 4 are the side plates or flanges, provided with slots, which form the bearings of the adjusting-bolts. 5 is a bottom plate, used as a convenient means of attaching the side plates to the wooden sheathing of the building. 6 6 are the slots in the side plates, in which the adjusting-bolt slides. 7 is an India-rubber cord, which may be used in applying the adjustable fastener to buildings. It is connected with the stud by being passed through an opening in it. It then passes down on each side of the stud and through an opening in the bottom plate, where it is fastened, as indicated at *g* in the drawing, and is used for keeping the stud in an erect position until after the stud has been inserted through the sheathing from below and until it is attached to the metal roof. Without some contrivance of this kind it would be difficult in the position indicated to keep the stud in position while the connection was being made.

S S are screws for attaching the bottom plate, and with it the side plates, to the sheathing. G is the sheathing of the roof, greatly enlarged in thickness in proportion, to illustrate the details of the connection of the adjustable fastener to buildings. H is the metallic roofing.

The method of using the invention in attaching metallic roofing to buildings is as follows: After sheathing the roof a hole is bored in the sheathing, at the point where the adjustable fastener is to be used, of sufficient size to allow the connecting-stud to move in the same with the expansion or contraction of the metallic roof. These holes receive the slotted flanges or side plates 4 4, and they are indicated in the drawing by the letter *a*. (See Fig. 2.) They should be of the shape and size required by the extent and direction of the contraction and expansion to be allowed for. The flanges or side plates are inserted in the holes, and the bottom plate is then firmly secured to the boards or sheathing G by the screws S S, as seen in Fig. 2. Where the sheathing is sufficiently thick a hole may be bored into it to receive the fastener from above. The side plates 4 and adjusting-bolt 3 are thus connected with the building. The connection with the metallic roof is then effected by holding the stud in an erect position by means of the rubber cord, and attaching the stud to the roofing by means of the screw 1. Both the wooden sheathing and the metallic roof are thus connected to the self-adjusting mechanism, consisting of the slotted side plates and the bolt which slides in them.

It is obvious that if the metal of the roofing contracts or expands in a line with the slots in the side plates that the bolt will adjust itself to such contraction or expansion by sliding in the slots in the proper direction.

On the other hand, in cases where the line of contraction or expansion may be diagonal or at right angles to the line of the slots in the side plates, the connecting-stud is arranged to slide upon the adjusting-bolt, as it is shown it may do in Figs. 2 and 3. Where, however, the movement is only sensible in the direction of the slots, the side plates are made to fit up close, as seen at Fig. 2 in the illustrations marked *, where the side plates or flanges are seen in cross-section, so that the only practical adjustability shall be in the direction of the slots.

I contemplate using my invention as a general fastener where it is necessary to allow for the contraction and expansion of the material used, not confining myself to buildings only.

Having thus fully described the construction and operation of my invention, what I claim as new, and desire to secure by Letters Patent, is—

1. The self-adjusting fastener, as described, for the purpose of attaching metallic coverings to buildings and accommodating itself to the contraction and expansion of the metal, and for fastening metals in any and all other places where the contraction and expansion demand an accommodation, substantially as set forth.

2. I claim, in combination with the adjusting-bolt and slotted side plates, suitably connected to and combined with the materials to be fastened together for the purpose of accommodating the expansion and contraction of such materials with reference to each other, substantially as specified.

ASA JOHNSON.

Witnesses:
W. HAUFF,
E. F. KASTENHUBER.